(12) United States Patent
Papin et al.

(10) Patent No.: US 10,662,974 B2
(45) Date of Patent: May 26, 2020

(54) TURBINE ENGINE FLOW GUIDE VANE WITH REMOVABLE ATTACHMENT

(71) Applicant: Safran Aircraft Engines, Paris (FR)

(72) Inventors: Thierry Georges Paul Papin, Moissy-Cramayel (FR); Marc-Antoine Anatole Got, Moissy-Cramayel (FR); Kaelig Merwen Orieux, Moissy-Cramayel (FR); Cedric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 123 days.

(21) Appl. No.: 15/829,687

(22) Filed: Dec. 1, 2017

(65) Prior Publication Data

US 2018/0156237 A1 Jun. 7, 2018

(30) Foreign Application Priority Data

Dec. 2, 2016 (FR) ...................................... 16 61887

(51) Int. Cl.
*F01D 9/04* (2006.01)
*F04D 29/56* (2006.01)
(Continued)

(52) U.S. Cl.
CPC ........... *F04D 29/563* (2013.01); *F01D 9/044* (2013.01); *F01D 25/246* (2013.01); *F02K 3/06* (2013.01);
(Continued)

(58) Field of Classification Search
CPC ........... F05D 2240/125; F05D 2260/31; F04D 29/542; F01D 9/041; F01D 9/042
See application file for complete search history.

(56) References Cited

U.S. PATENT DOCUMENTS 2,772,069 A * 11/1956 Hockert .................. F01D 9/042
415/134
3,932,056 A * 1/1976 Tai .......................... F01D 5/225
415/209.4
(Continued)

FOREIGN PATENT DOCUMENTS

EP 2472060 A1 7/2012
EP 2592234 A2 5/2013
(Continued)

OTHER PUBLICATIONS

Preliminary Research Report received for French Application No. 1661887, dated Jun. 28, 2017, 3 pages (1 page of French Translation Cover Sheet and 2 page of original document).

*Primary Examiner* — Ninh H. Nguyen
(74) *Attorney, Agent, or Firm* — Womble Bond Dickinson (US) LLP

(57) ABSTRACT

The invention relates to a guide vane intended to be mounted in a turbine engine between an inner shroud (17) and an outer shroud (16), comprising a longitudinal straightening body (41) for an air flow extending between a first end (42) intended to be positioned at the inner shroud (17) and a second end (44) intended to be positioned at the outer shroud (16), the longitudinal straightening body having an aerodynamic profile defined by a leading edge (41a) and a trailing edge (41b) in the flow direction of the air flow, and by a camber line (41c) extending from the leading edge (41a) to the trailing edge (41b). It further comprises a first attachment heel (43) and a second attachment heel (45) positioned in the continuation of the longitudinal body (41) at the first end (42) and the second end (44) respectively, the first (43) and second (45) attachment heels being planar elements arranged parallel with respect to one another, each attach-
(Continued)

ment heel (43; 45) being arranged at a distance from the leading edge (41*a*) and from the trailing edge (41*b*).

15 Claims, 6 Drawing Sheets

(51) Int. Cl.
*F02K 3/06* (2006.01)
*F04D 29/64* (2006.01)
*F04D 29/54* (2006.01)
*F01D 25/24* (2006.01)

(52) U.S. Cl.
CPC ......... *F04D 29/544* (2013.01); *F04D 29/644* (2013.01); *F05D 2220/323* (2013.01); *F05D 2230/61* (2013.01); *F05D 2240/12* (2013.01); *F05D 2260/31* (2013.01); *Y02T 50/672* (2013.01)

(56) References Cited

U.S. PATENT DOCUMENTS

| | | | |
|---|---|---|---|
| 5,411,370 A | | 5/1995 | Varsik |
| 5,586,864 A | * | 12/1996 | Knorowski ............. F01D 9/044 |
| | | | 415/209.2 |
| 10,174,619 B2 | * | 1/2019 | Uskert .................... F01D 9/044 |
| 2012/0213634 A1 | * | 8/2012 | Samuelsson ........... F01D 9/042 |
| | | | 415/209.3 |
| 2013/0333350 A1 | | 12/2013 | Stilin et al. |

FOREIGN PATENT DOCUMENTS

| | | |
|---|---|---|
| EP | 2142761 B1 | 3/2014 |
| FR | 2685383 A1 | 6/1993 |
| FR | 2998610 A1 | 5/2014 |
| GB | 2262574 A | 6/1993 |
| WO | 2009/048357 A1 | 4/2009 |

* cited by examiner

TURBINE ENGINE FLOW GUIDE VANE WITH REMOVABLE ATTACHMENT

FIELD OF THE INVENTION

The invention relates to an air flow guide vane wheel for a turbine engine, and more specifically to guide vanes used in such a guide vane wheel. The invention applies in particular to bypass turbine engines.

PRIOR ART

A bypass turbine engine for aeronautical propulsion is shown in FIG. 1a. The turbine engine 1 comprises a fan 10 delivering an air flow of which a central portion, called the primary flow FP, is injected into a primary stream comprising a compressor 12 which supplies a turbine 14 driving the fan.

The peripheral portion of the air flow, called the secondary flow FS, which circulates in a secondary stream is, for its part, ejected toward the atmosphere to supply the major portion of the thrust of the turbine engine 1, after having passed through a fixed guide vane 40 wheel 20 disposed downstream of the fan. The guide vanes have aerodynamic profiles and extend in a radial direction (FIG. 1b).

The guide vanes 20 (also known under the acronym OGV for "outlet guide vane", or called rectifiers) are arranged in a ring, called guide vane wheel, which allows to straighten out the secondary air flow at the outlet of the fan (i.e. to rectify the air flow), while limiting load losses. This guide vane wheel 20 is preferably situated at an intermediate casing.

Depending on their azimuth position (3H, 6H, 9H, etc.), the guide vanes 40 generally have different types of aerodynamic profiles P1, P2, P3 . . . , i.e. they do not all have the same camber between the leading edge and the trailing edge of the guide vane. In certain turbine engines, up to seven different profiles of guide vanes can be counted. The different cambers can for example serve to compensate for different passage cross-sections between guide vanes 40, due to the passage of lead-throughs, as explained in the following paragraph.

In FIG. 1a, which illustrates an embodiment of the turbine engine, is shown a structural arm 30 which connects the outer shroud 16 of the intermediate casing to the hub 17 of the intermediate casing, also called the inner shroud, thus contributing to support and to hold in position the engine shaft(s) 18 and ensure the structural durability of the assembly. The structural arm also has the function of allowing the transmission of movement or of fluids between the turbine engine and the rest of the aircraft on which it is mounted. To this end, the structural arm is hollow, and allows lead-throughs to be accommodated such as pipes or transmission shafts for example.

The structural arm can possibly be integrated into the guide vane wheel 20; it thus also provides the function of a guide vane 40.

In certain embodiments, however, the guide vane wheel 20 does not include any structural arm and is therefore purely aerodynamic.

The guide vane wheel 20 is provided for aerodynamic continuity in the secondary stream, and thus comprises an inner platform 50 and an outer platform, between which extend radially the guide vanes 40. These platforms allow the reconstitution of the secondary stream between each guide vane 40 of the wheel 20. For example, as illustrated in FIG. 1c, the platforms are mounted, i.e. between two adjacent guide vanes 40, a plate is positioned, the structure of which matches the shape of the hub. Two adjacent guide vanes 40 can have different profiles; it is necessary, however, to have a certain number of plates of different shapes to be able to create a sealed platform with the guide vanes 40. There also exist turbine engines for which the platforms are integrated, i.e. the platforms are integrally formed with the guide vanes. It is more convenient to achieve a seal, but the guide vane wheel becomes more difficult to dismount. Reference can be made to document FR2998610 for a solution facilitating the installation of the seal by means of a groove.

The guide vanes 40 also preferably play the role of absorbing loads, distributed over the entire ring on which they are arranged. To this end, it is important that the attachment of the guide vanes with respect to the turbine engines be durable. The solutions that exist for attaching the guide vanes solidly while still guaranteeing good aerodynamic performance present disadvantages, however, in terms of replacement of said guide vanes in case they are damaged.

One aim of the present invention is to propose a guide vane and a guide vane wheel which make it possible to respond to the aforementioned constraints and which also allow rapid and simple mounting and dismounting of the guide vane on the guide vane wheel.

In particular, one aim of the present invention is to propose a guide vane and a guide vane wheel for which one or more guide vanes can be easily and rapidly mounted and dismounted directly under the wing of the aircraft in which the turbine engine is mounted.

DISCLOSURE OF THE INVENTION

To this end, a guide vane is proposed intended to be mounted in a turbine engine between an inner shroud and an outer shroud, comprising a longitudinal body for rectifying an air flow extending between a first end intended to be positioned at the inner shroud and a second end intended to be positioned at the outer shroud, the longitudinal body having an aerodynamic profile defined by a leading edge and a trailing edge in the flow direction of the air flow, and by a camber line extending from the leading edge to the trailing edge, characterized in that it further comprises a first attachment heel and a second attachment heel positioned in the continuation of the longitudinal body at the first end and the second end respectively, the first and second attachment heels being planar elements arranged parallel with respect to one another, each attachment heel being arranged at a distance from the leading edge and from the trailing edge.

Preferred but non-limiting aspects of this guide vane, taken alone or in combination, are the following:

each attachment heel is arranged at a distance with respect to the leading edge comprised between 20% and 80% of the length of the camber line, preferably between 40% and 60% of the length of the camber line.
 each attachment heel is arranged equidistantly from the leading edge and from the trailing edge.
 each attachment heel extends over a length comprised between 50% and 60% of the length of the camber line.
 the attachment heels are integrally formed with the longitudinal body.
 the guide vane further comprises a first attachment fitting and a second attachment fitting for removable attachment of the first and second attachment heels to the inner and outer shrouds, respectively.

at least one of the first and second attachment fittings has a support member intended to rest on the corresponding shroud, and allowing the guide vane to be pivoted with respect to the corresponding shroud, pivoting in particular around an axis substantially in the general direction of the longitudinal body of the guide vane.

the support member comprises an end having a shape suitable for being inserted into a groove arranged on the corresponding shroud.

the support member comprises an end having the shape of a right prism with a trapezoidal base intended to be inserted into a groove with a conical cross-section arranged on the corresponding shroud.

each attachment fitting comprises a coupling portion intended to be attached to the corresponding attachment heel, and two anchoring tabs to provide for attachment to the inner and outer shrouds.

Also proposed is a guide vane wheel comprising a plurality of guide vanes as above, wherein all the guide vanes have identical attachment heels.

Also proposed is a guide vane wheel comprising a plurality of guide vanes as above, wherein all the guide vanes have identical first attachment fittings and identical second attachment fittings.

Finally, a bypass turbine engine is proposed comprising an inner shroud forming a hub, and an outer shroud delimiting, with the hub, an air circulation stream, and a guide vane wheel as above, to rectify the air flow circulating in said air circulation stream.

DESCRIPTION OF THE FIGURES

Other features and advantages of the invention will be revealed by the description that follows, which is purely illustrative and not limiting and must be read with reference to the appended drawings, in which.

DETAILED DESCRIPTION OF THE INVENTION

Figure 1A:
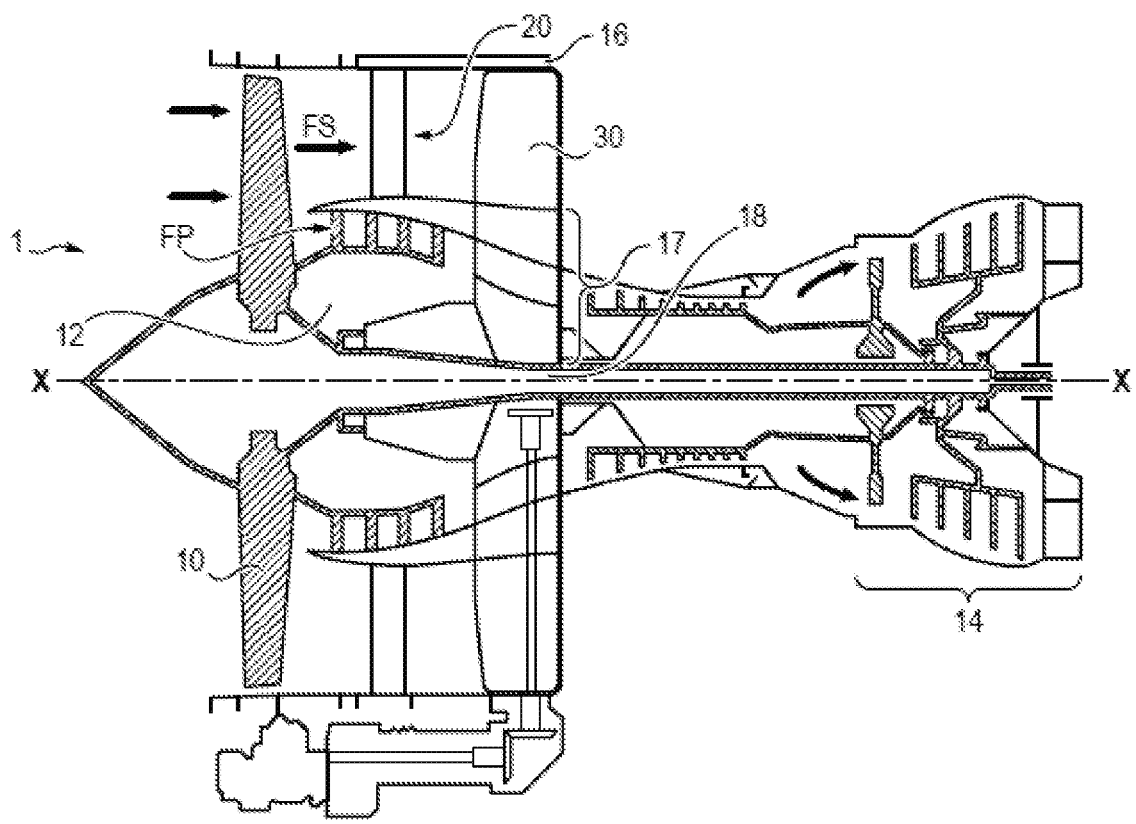
FIG. 1a, already described, shows schematically a bypass turbine engine.
Figure 1C:
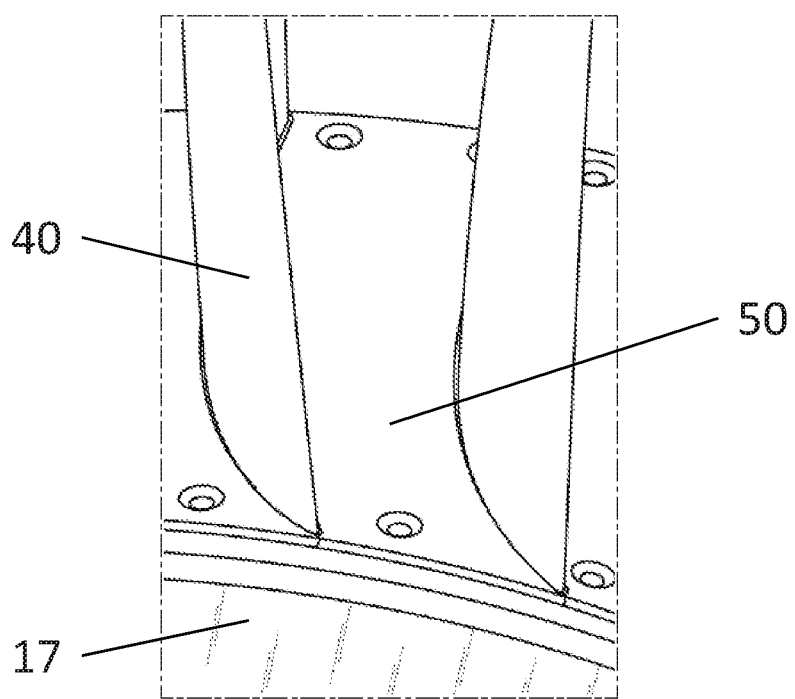
FIG. 1c, already described, is a detail schematic illustrating a platform between two guide vanes.
Figure 1B:
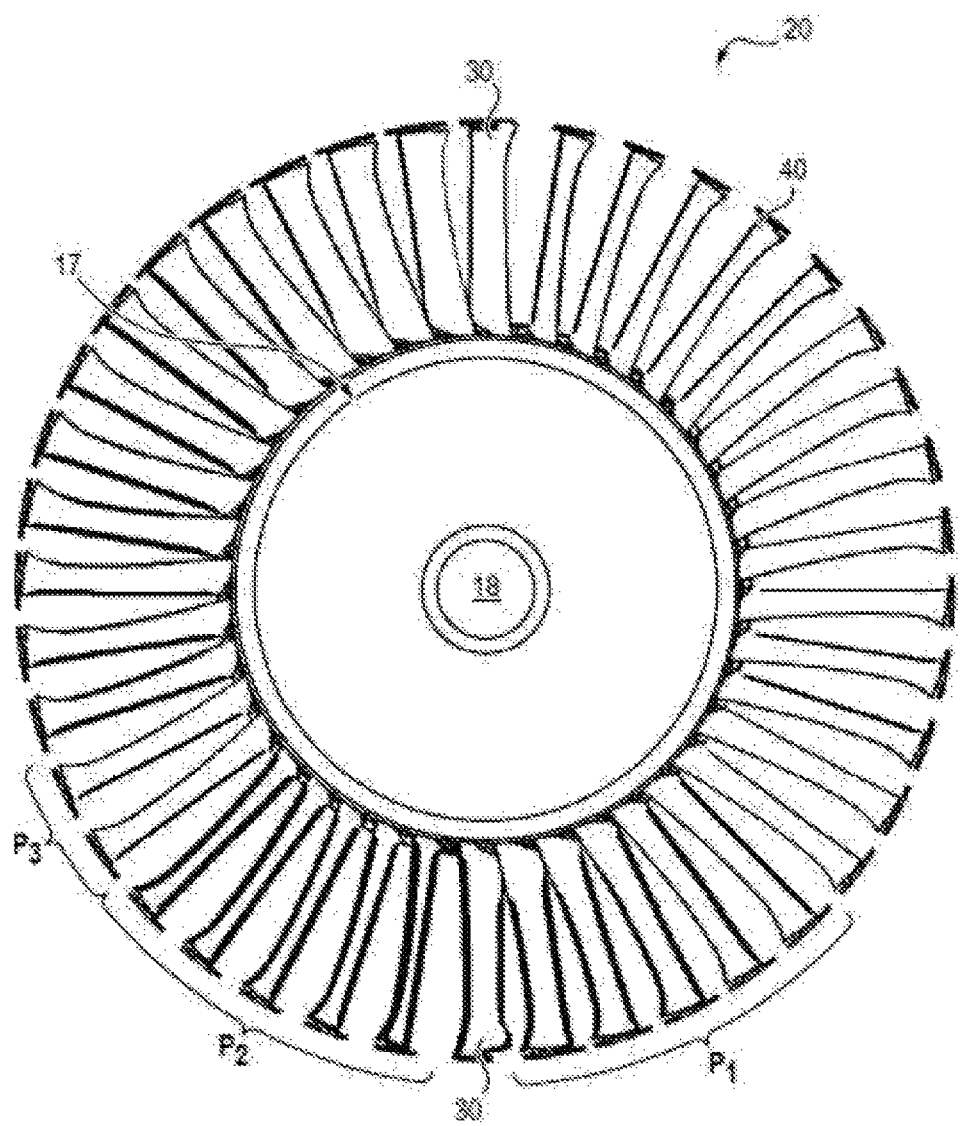
FIG. 1b, already described, shows a guide vane wheel.

With reference to FIGS. 1a and 1b, an air flow guide vane wheel 20 of a secondary stream is shown (with reference symbol FS, as the secondary flow) of a turbine engine 1.

As indicated above, each guide vane 40 is disposed radially outside the inner shroud 17, also called the hub, and radially inside the outer shroud 16. The guide vane wheel 20 serves to straighten out the secondary flow originating in the fan 10.

However, the guide vane wheel 20 as described in the present application is not limited to its use in the secondary stream and could for example be implemented in the primary stream of the turbine engine.

The guide vane wheel 20 comprises a plurality of guide vanes 40 distributed regularly around a ring (not shown) centered on an axis X-X of the turbine engine, corresponding to the axis of the engine shaft (FIG. 1a). The guide vanes 40 thus extend radially around the axis X-X.

Figure 2:
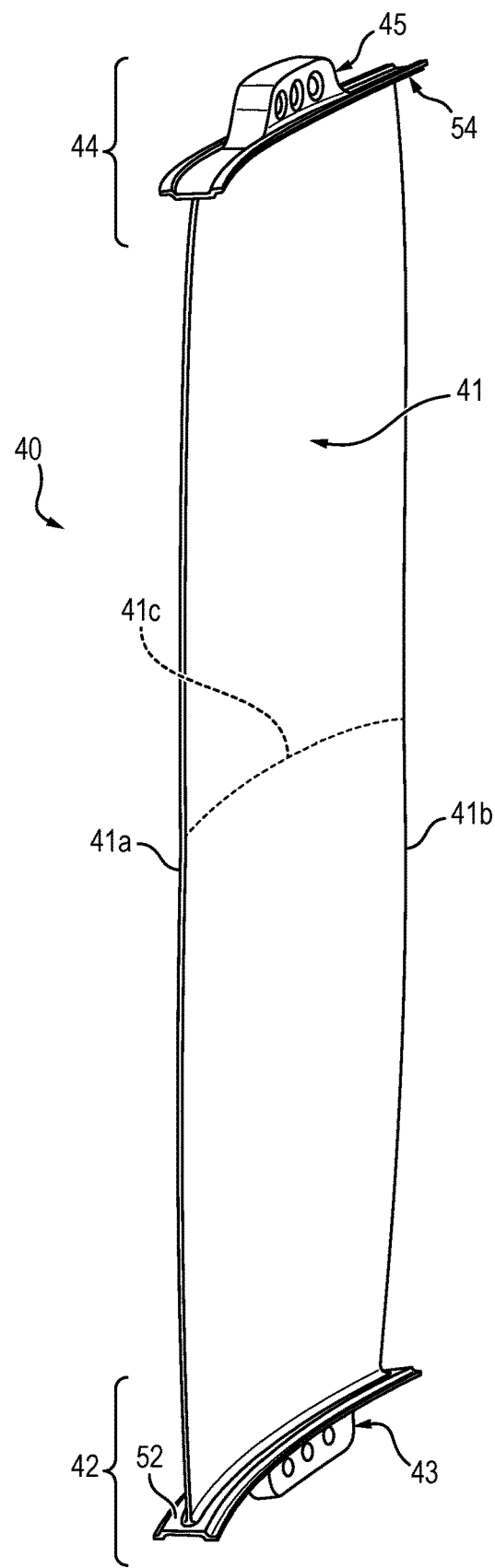
FIG. 2 is a view of an embodiment of a guide vane according to the invention.

As illustrated in FIG. 2, a guide vane 40 conventionally comprises a longitudinal body 41 the function of which is to straighten out the air flow coming into contact with the guide vane 40.

This longitudinal body 41 extends in an extension direction between a first end 42 intended to be positioned at the inner shroud 17 and a second end 44 intended to be positioned at the outer shroud 16.

The longitudinal body 41 of the guide vane 40 further extends in the direction of the air flow, perpendicular to the extension direction, between a leading edge 41a and a trailing edge 41b.

The camber line 41c which extends from the leading edge 41a to the trailing edge 41b defines the specific aerodynamic properties of the guide vane 40.

The longitudinal body 41 generally has a shape such that the distance between the pressure surface and the suction surface is not constant, given that the pressure surface is the concave hollow surface of the guide vane and that the suction surface is the convex surface of the guide vane.

In fact, the profile of the longitudinal body 41 is generally such that the distance between the pressure surface and the suction surface increases from the leading edge 41a until a maximum distance, then diminishes toward the trailing edge 41b.

The profile of the longitudinal body 41 can for example correspond substantially to the profile of a wing.

The profile of the guide vane 40 is therefore such that the intermediate portion of the longitudinal body 41, or central portion, i.e. the portion between the leading edge 41a and the trailing edge 41b at a distance from these leading 41a and trailing 41b edges, has a greater thickness than the portions of the longitudinal body 41 at the leading edge 41a and the trailing edge 41b respectively.

The guide vanes 40 can be designed in a composite material even if metal guide vanes are also practicable.

In order to allow attachment to the inner shroud 17 or to the outer shroud 16, each guide vane 40 comprises attachment means in the form of an inner attachment heel 43, also called attachment lug, intended to be coupled to the inner shroud 17, and an outer attachment heel 45 intended to be coupled to the outer shroud 16.

The attachment heels (43; 45) are an integral part of the guide vane 40 and are integrally formed with the corresponding body 41.

The attachment heels (43; 45) must not hinder the fluid flow in the secondary stream and for that purpose they are arranged on the guide vane 40 so as to be outside this stream.

In particular, the attachment heels (43; 45) preferably extend beyond the platform(s) 50 aerodynamically delimiting the stream.

The two attachment heels (43; 45) provided at the ends (42; 44) of the guide vane 40 are planar elements arranged parallel to one another.

Preferably, these planar elements forming the attachment heels (43; 45) are intended to be attached to the corresponding shrouds so as to be parallel to the air flow circulating in the stream.

According to the specific configuration of the proposed guide vanes 40, the attachment heels (43; 45) are arranged at a distance from the leading edge 41a and from the trailing edge 41b. The attachment heels (43; 45) are preferably arranged in the continuation of the central portion of the longitudinal body 41, i.e. at the longitudinal body 41 having a certain thickness, in particular by comparison to the thickness of the longitudinal body 41 at the leading 41a and trailing 41b edges respectively.

Preferably, each attachment heel (43; 45) is arranged at a distance with respect to the leading edge 41a comprised between 20% and 80% of the length of the camber line 41c, and more preferably between 40% and 60% of the length of the camber line 41c. For example, in the positioning interval from 20% to 80% in which the heels are provided to extend, these heels occupy a certain extent which can have between 50% and 60% of the length of the camber line.

Advantageously, the attachment heels (43; 45) are not in correspondence with thin areas, less strong, of the longitudinal body 41 of the guide vane, by being remote from the leading edge and the trailing edge.

According to a particular embodiment, each attachment heel (43; 45) is arranged equidistantly from the leading edge 41a and from the trailing edge 41b, i.e. in the middle of the curvature line 41c.

Such an arrangement of the attachment heels (43; 45) is particularly advantageous because it allows the enabling of a force path in the thickest and strongest area of the guide vane, and therefore avoiding stressing weaker, thinner areas, namely those situated at the leading edge and the trailing edge.

As indicated above, the attachment heels (43; 45) are preferably planar elements. This allows the guide vane 40 to be formed without a break, either a disconnection or a considerable curvature, which is particularly advantageous because this improves the life expectancy of the guide vane 40. In particular, when the guide vane 40 is formed in a composite material, the specific design allows fiber continuity to be ensured, in particular without disconnection of said fibers with respect to adjoining fibers, and thus allows buckling of the fibers at an excess curvature to be avoided.

The attachment heels (43; 45) can typically comprise a plurality of transverse openings which have the function of allowing coupling with the inner 17 and outer 16 shrouds.

Figure 3:
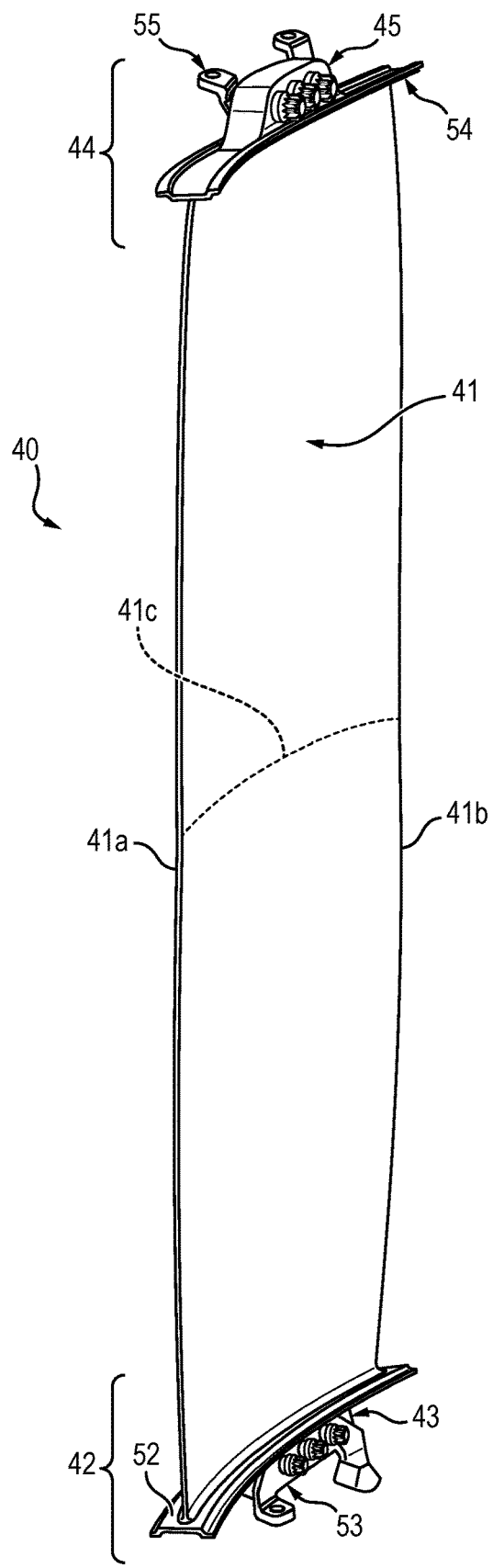
FIG. 3 is a view of the guide vane of FIG. 2 with attachment fittings.

Preferably, the coupling between the guide vane 40 and the inner 17 and outer 16 shrouds at the inner 43 and outer 45 attachment heels respectively is done by means of attachment fittings (53; 55) as illustrated in FIG. 3.

Such attachment fittings are provided to ensure removable attachment of the guide vanes 40 with respect to the inner 17 and outer 16 shrouds of the turbine engine.

These attachment fittings (53; 55) are intended to be attached to the attachment heels (43; 45) of the guide vane 40, for example by counter drilling. As illustrated in FIG. 3 or in FIGS. 5 and 8, attachment can for example be done by means of connection screws cooperating with the transverse openings formed in the attachment heels (43; 45). Any other means of attachment can however be considered, the attachment fittings being able for example to have means for forming a sandwich with the attachment heels and thus ensure the required attachment.

Figure 4:
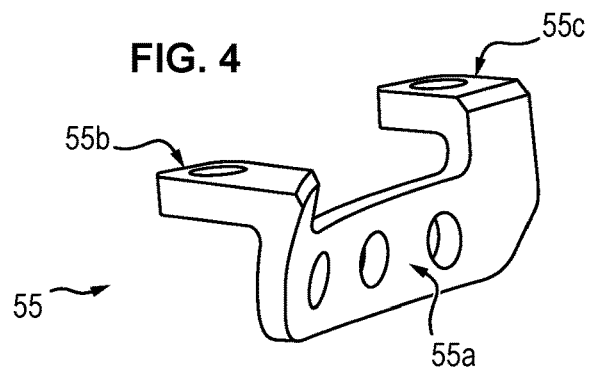
FIG. 4 is a view of an attachment fitting according to a first embodiment.
Figure 6:
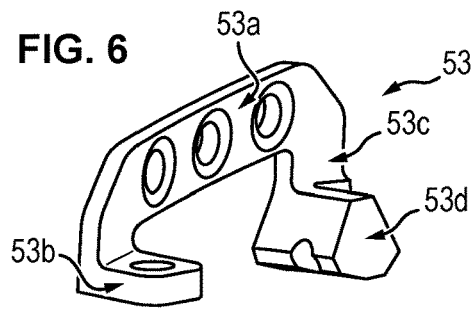
FIG. 6 is a view of an attachment fitting according to a second embodiment of the invention.

As illustrated in FIGS. 4 and 6, the attachment fittings (53; 55) can for example have a coupling portion (53a; 55a) intended to be attached to the corresponding attachment heel (43; 45), and two anchoring tabs (53b, 53c; 55b, 55c) to provide for attachment to the inner 17 and outer 16 shrouds, respectively.

The attachment fittings used could have identical shapes for the inner 43 and outer 45 attachment heels.

It is preferable, however, to provide for an inner attachment fitting 53 specifically suitable for cooperating with the inner attachment heel 43 for the purpose of attachment to the inner shroud 17, and an outer attachment fitting 55 specifically suitable for cooperating with the outer attachment heel 45 for the purpose of attachment to the outer shroud 16.

Figure 5:
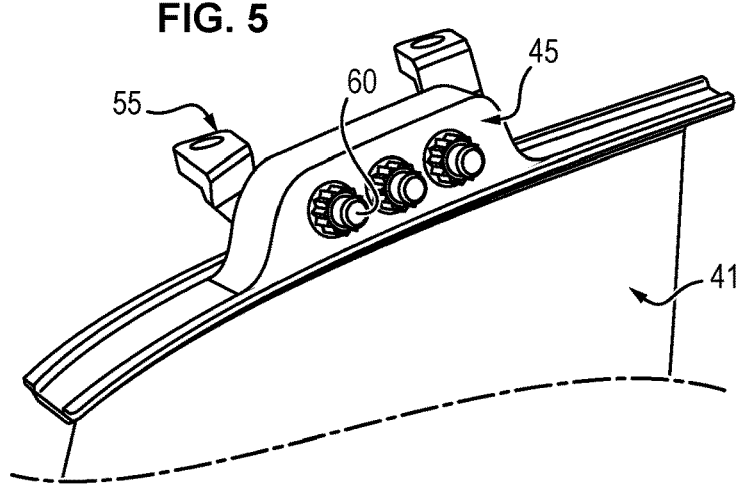
FIG. 5 is a view of the attachment fitting of FIG. 4 coupled to an attachment heel of the guide vane of FIG. 2.

Thus, FIG. 4 illustrates an embodiment of an outer attachment fitting 55 for attaching the guide vane 40 to the outer shroud 16. FIG. 5 illustrates the assembly of such an outer attachment fitting 55 to the outer attachment heel 45 of the guide vane 40.

According to this embodiment, the anchoring tabs (55b, 55c) of the outer attachment fitting 55 comprise attachment openings allowing the insertion of the screws in a radial direction with respect to the outer shroud 16.

The inner attachment fitting 53 could have similar anchoring tabs with attachment openings also allowing insertion of the screws in a radial direction with respect to the inner shroud 17.

According to a preferred embodiment, however, at least one of the attachment fittings—here the inner attachment fitting 53—comprises a support member intended to rest on the corresponding shroud, and allowing the guide vane to be pivoted with respect to the corresponding shroud. The pivoting in particular can be along an axis substantially in the general direction of the longitudinal body of the guide vane.

Figure 7:
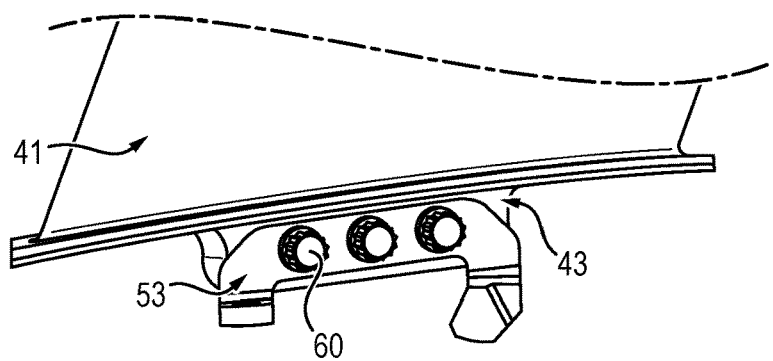
FIG. 7 is a view of the attachment fitting of FIG. 6 coupled to an attachment heel of the guide vane of FIG. 2.

FIG. 6 illustrates an embodiment of such an inner attachment fitting 53 to ensure the attachment of the guide vane 40 to the inner shroud 17. FIG. 7, for its part, illustrates the assembly of such an attachment fitting 53 to the inner attachment heel 43 of the guide vane 40.

According to the embodiment shown in FIGS. 6 and 7, the inner attachment fitting 53 comprises a first anchoring tab 53b with an attachment opening allowing the insertion of a screw in a radial direction with respect to the inner shroud 17.

The second anchoring tab 53c of the attachment fitting 53 forms, for its part, a support member provided to allow the guide vane 40 to pivot easily with respect to the inner shroud 17.

In this regard, the support member comprises an end 53d having a shape suitable for being inserted into a groove 17a arranged on the inner shroud 17.

According to the embodiment illustrated in FIGS. 6 to 9, the support member comprises an end 53d having the shape of a right prism with a trapezoidal base intended to be inserted into a groove 17a with a conical cross-section arranged on the inner shroud 17.

An end 53d having a different specific shape could also be provided, as long as it is suitable to be inserted in the groove 17a provided in the inner shroud 17 and allows the function of a pivot to be provided.

The geometry of the end 53d can also enable the load absorption provided by the guide vane.

As illustrated in FIG. 6, the second anchoring tab 53c can further comprise an attachment opening allowing a screw to be inserted for the purpose of attachment to the inner shroud 17.

In the embodiment illustrated in FIG. 6, the attachment opening is provided on the second anchoring tab 53c so as to allow the insertion of a screw tangentially or almost—tangentially with respect to the inner shroud 17.

Figure 8:
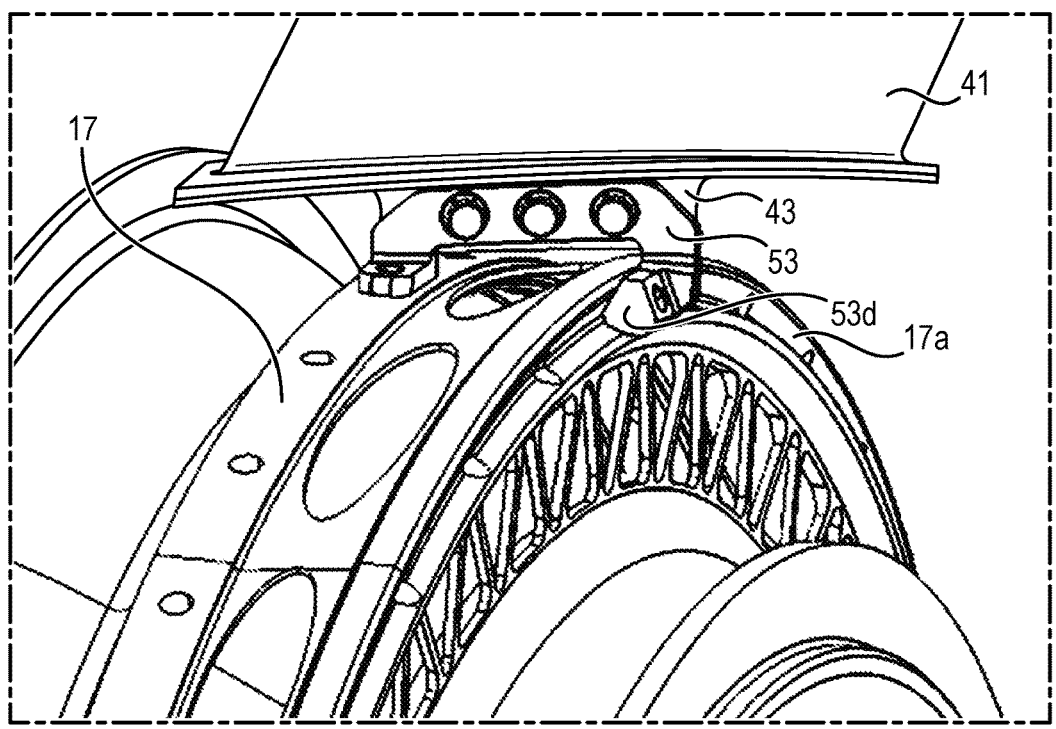
FIG. 8 is a view of the attachment fitting associated with the attachment heel conforming to FIG. 7 mounted on the hub of a turbine engine.
Figure 9:
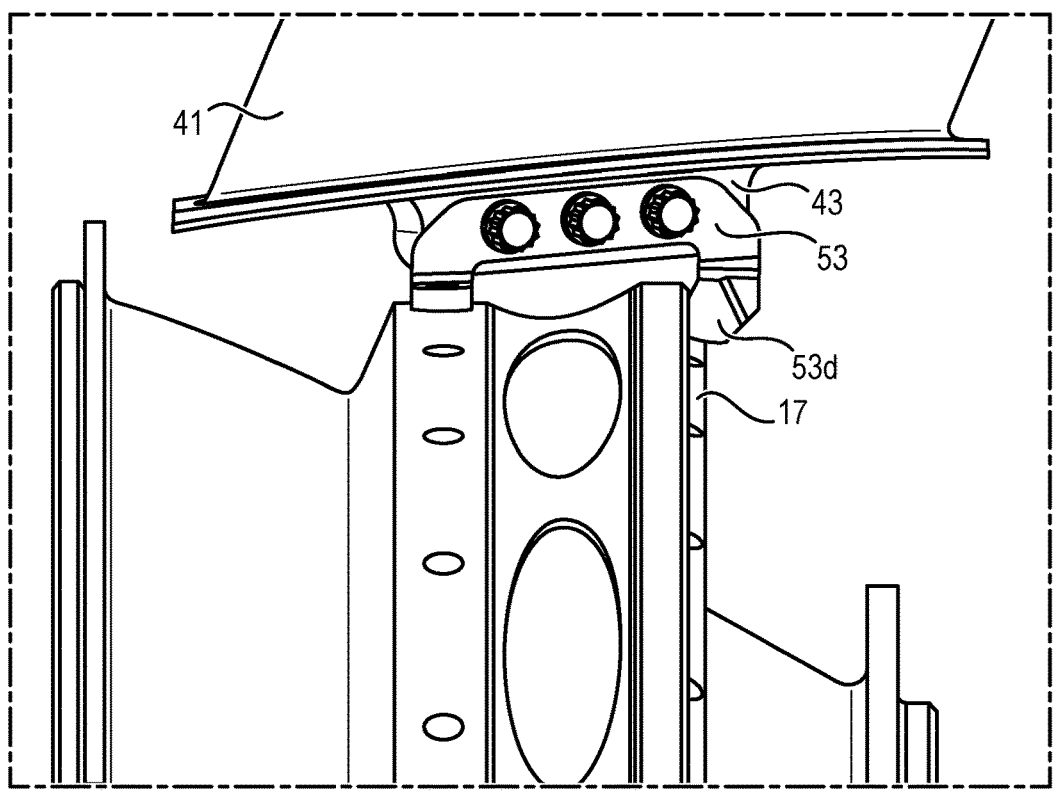
FIG. 9 is a side view of the arrangement of FIG. 8.

FIGS. 8 and 9 illustrate how the attachment fitting 53 associated with the inner attachment heel 43 of the guide vane 40 is attached to the inner shroud 17. It will easily be understood from these figures that the end 53*d* of the second anchoring tab 53*c* creates a support point of the inner anchoring fitting 53 on the inner shroud 17 enabling a rotation movement of the guide vane 40 with respect to the inner shroud 17 (when all the attachment screws have been withdrawn) around a pivot axis tangential to the inner shroud 17 and perpendicular to the axis X-X of the engine shaft.

Such an arrangement of the guide vane 40 and of the attachment fittings (53; 55) is particularly advantageous for the mounting/dismounting of the guide vane with respect to the turbine engine. In particular, the specific arrangement presented allows easy mounting/dismounting under the wing, i.e. directly on the aircraft. It is not necessary to completely dismount the guide vane wheel, or to dismount the turbine engine from the aircraft, and it is therefore practicable to change only one defective guide vane 40 directly in the guide vane wheel 20.

Another advantage of the arrangement proposed above with attachment fittings (53; 55) adapted to the attachment heels (43; 45) is that it is possible to makes all the attachment fittings uniform over all the profiles of the guide vane 40. In fact, each guide vane 40 can comprise a longitudinal body 41 profile which is a specific function of the desired aerodynamic action, while the attachment heels (43; 45) provided at each end of the longitudinal body 41 are provided to receive the unique geometry of the attachment fittings, more specifically the unique geometry of the inner attachment fitting and the unique geometry of the outer attachment fitting if they have different geometries.

This involves savings, particularly with respect to replacement parts, which facilitates the mounting/dismounting operation because the attachment fittings to be used are the same for all the guide vanes.

As indicated above, the continuity of the stream is generally provided for by platforms 50 mounted between each guide vane 40. It should be noted that the guide vane 40 can possibly comprise an integrated platform, i.e. integrally formed with the rest of the elements forming the guide vane, at the ends of said guide vane 40.

In such a case, as illustrated in FIGS. 2, 3, 5 and 7, the guide vane 40 comprises at its inner end 42 an integrated platform 52 and at its outer end 44 an integrated platform 54. The integrated platforms (52; 54) form an integral part of the guide vane 40 and form a single part, manufactured during the same steps (for example by molding composite material).

Preferably, the dimensions of these integrated platforms (52, 54) are such that they do not touch one another (along a periphery of the hub) when they are installed. In order to reconstruct the complete platform of the secondary stream, the platform is completed by mounted platforms, i.e. independent parts which are assembled to the integrated platforms (52, 54).

The guide vanes 40 and the guide vanes wheel 20 presented above can be used by any type of turbine engine requiring such a wheel, and on any aircraft comprising such a turbine engine, in particular in a bypass turbine engine.

The invention claimed is:

1. A guide vane assembly for use in a turbine engine, comprising:
  a guide vane comprising a longitudinal body for rectifying an air flow, the longitudinal body extending longitudinally between a first end intended to be positioned at an inner shroud and a second, opposite end intended to be positioned at an outer shroud, the longitudinal body extending laterally between a leading edge relative to an air flow direction and a trailing edge relative to the air flow direction, the longitudinal body having an aerodynamic profile defined by the leading edge, the trailing edge, and a camber line extending from the leading edge to the trailing edge;
  a first attachment heel positioned adjacent and extending longitudinally from and beyond the first end;
  a second attachment heel positioned adjacent the second end and extending longitudinally from and beyond the second end;
  wherein the first and second attachment heels being planar elements are arranged parallel with respect to one another, wherein the first and second attachment heels are arranged at a distance from the leading edge and from the trailing edge of the longitudinal body such that a lateral dimension of each of the first and second attachment heels is less than a lateral dimension of the longitudinal body;
  a first attachment fitting for removable attachment of the first attachment heel to the inner shroud; and
  a second attachment fitting for removable attachment of the second attachment heel to the outer shroud;
  wherein at least one of the first and second attachment fittings has a support member intended to rest on the corresponding inner or outer shroud and is configured such that the guide vane is pivotable with respect to the corresponding inner and outer shroud.

2. The guide vane assembly of claim 1, wherein each attachment heel is arranged at a distance from the leading edge of between 20% and 80% of a length of the camber line.

3. The guide vane assembly of claim 1, wherein each attachment heel is arranged equidistantly from the leading edge and from the trailing edge.

4. The guide vane assembly of claim 1, wherein the lateral dimension of each of the first and second attachment heels is between 50% and 60% of a length of the camber line.

5. The guide vane assembly of claim 1, wherein the attachment heels are integrally formed with the longitudinal body.

6. The guide vane assembly of claim 1, wherein the support member comprises an end having a shape suitable for being inserted into a groove arranged on the corresponding shroud.

7. The guide vane assembly of claim 1, wherein the support member comprises an end having the shape of a right prism with a trapezoidal base intended to be inserted into a groove with a conical cross-section arranged on the corresponding shroud.

8. The guide vane assembly of claim 1, wherein each attachment fitting comprises a coupling portion intended to be attached to the corresponding attachment heel and two anchoring tabs to provide for attachment to the inner and outer shrouds.

9. A guide vane wheel for a turbine engine comprising:
  at least one guide vane intended to be mounted between an inner shroud and an outer shroud, wherein:
  the guide vane comprises a longitudinal body for rectifying an air flow, the longitudinal body extending longitudinally between a first end intended to be positioned at the inner shroud and a second end intended to be positioned at the outer shroud, the longitudinal body extending between a leading edge relative to an air flow direction and a trailing edge relative to the air flow direction, the longitudinal body having an aerodynamic profile defined by the leading edge and the trailing edge n and by a camber line extending from the leading edge to the trailing edge, the guide vane comprising a first attachment heel and a second attachment heel, the first attachment heel positioned at the first end and the second attachment heel positioned at the second end such that, when the guide vane is mounted between the inner shroud and the outer shroud, the first attachment heel extends from the first end toward the inner shroud and the second attachment heel extends from the second end toward the outer shroud, wherein the first and second attachment heels being planar elements are arranged parallel with respect to one another, wherein each of the first and second attachment heels is arranged at a distance from the leading edge and from the trailing edge such that a lateral extension of the attachment heels is less than a lateral extension of the longitudinal body; and an attachment fitting for removable attachment of one of the first attachment heel to the inner shroud or the second attachment heel to the outer shroud;

wherein the attachment fitting has a support member intended to rest on the corresponding inner or outer shroud and is configured such that the guide vane is pivotable with respect to the corresponding inner or outer shroud.

10. The guide vane wheel of claim 9, further comprising another attachment fitting for removable attachment of the other of the first and second attachment heels to the inner and outer shrouds, respectively.

11. The guide vane wheel of claim 10, wherein the attachment fitting and the another attachment fitting are identical.

12. The guide vane wheel of claim 9, wherein the guide vane wheel comprises a plurality of guide vanes, and wherein each of the plurality of guide vanes comprises identical first and second attachment heels.

13. A bypass turbine engine comprising:
an inner shroud;
an outer shroud;
a plurality of guide vanes configured to rectify air flow circulating in the engine;
each guide vane mounted between the inner shroud and the outer shroud of the turbine engine and comprising:
    a longitudinal body extending between a first end mounted at the inner shroud and a second end mounted at the outer shroud, the longitudinal body having an aerodynamic profile defined by a leading edge and a trailing edge relative to a direction of the air flow, and by a camber line extending from the leading edge to the trailing edge; and
    a first attachment heel at the first end of the longitudinal body and a second attachment heel at the second end of the longitudinal body such that the first attachment heel extends from the first end toward the inner shroud and the second attachment heel extends from the second end toward the outer shroud, the first and second attachment heels being planar elements arranged parallel with respect to one another, each attachment heel being arranged at a distance from the leading edge and from the trailing edge such that a lateral extension of the attachment heels is less than a lateral extension of the longitudinal body;
    an attachment fitting for removable attachment of one of the first attachment heel to the inner shroud or the second attachment heel to the outer shroud;
    wherein the attachment fitting has a support member intended to rest on the corresponding inner or outer shroud and is configured such that the guide vane is pivotable with respect to the corresponding inner or outer shroud.

14. The bypass turbine engine of claim 13, further comprising another attachment fitting for removable attachment of the other of the first and second attachment heels to the inner and outer shrouds, respectively, wherein the attachment fitting for each of the plurality of guide vanes is identical, and wherein the another attachment fitting is identical for each of the plurality of guide vanes.

15. The bypass turbine engine of claim 13, wherein the guide vanes are mounted to the inner shroud and the outer shroud such that the first and second attachment heels are arranged parallel with respect to the air flow direction.

* * * * *